United States Patent
Wang

(10) Patent No.: US 12,154,562 B2
(45) Date of Patent: Nov. 26, 2024

(54) VEHICLE, VOICE CONTROL DEVICE AND METHOD

(71) Applicant: Volvo Car Corporation, Gothenburg (SE)

(72) Inventor: Wei Wang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 348 days.

(21) Appl. No.: 17/573,706

(22) Filed: Jan. 12, 2022

(65) Prior Publication Data

US 2022/0230636 A1    Jul. 21, 2022

(30) Foreign Application Priority Data

Jan. 15, 2021   (CN) .......................... 202110053539.3

(51) Int. Cl.
*G10L 15/22*      (2006.01)
*B60R 16/037*    (2006.01)
*G06F 3/16*        (2006.01)

(52) U.S. Cl.
CPC .......... *G10L 15/22* (2013.01); *B60R 16/0373* (2013.01); *G06F 3/167* (2013.01); *G10L 2015/223* (2013.01)

(58) Field of Classification Search
CPC .............. G10L 15/22; G10L 2015/223; B60R 16/0373; B60K 35/00; B60W 30/18; G06F 3/167; G06V 20/593
See application file for complete search history.

(56) References Cited

U.S. PATENT DOCUMENTS

| | | | | | |
|---|---|---|---|---|---|
| 6,240,347 B1 * | 5/2001 | Everhart | ................ | B60K 35/00 | 701/1 |
| 7,774,202 B2 * | 8/2010 | Spengler | ................. | G10L 15/22 | 704/241 |
| 11,577,742 B2 * | 2/2023 | Lenke | ..................... | G10L 15/22 | |

(Continued)

FOREIGN PATENT DOCUMENTS

| CN | 106228634 A | * | 12/2016 | ........... | G07C 5/0841 |
|---|---|---|---|---|---|
| CN | 107021036 A | * | 8/2017 | ............. | G10L 15/22 |

(Continued)

OTHER PUBLICATIONS

Jun. 3, 2022 European Search Report issued in corresponding International Application No. 22151314.

*Primary Examiner* — Vijay B Chawan
*Assistant Examiner* — Nadira Sultana
(74) *Attorney, Agent, or Firm* — Clements Bernard Walker; Christopher L. Bernard

(57) ABSTRACT

A voice control method for controlling functions of a vehicle including: creating a voice instruction set including voice instructions for converting interface elements associated with related vehicle functions into voice-controllable elements without any wake-up word; acquiring one or more interface elements currently presented on a human-machine interface (HMI) of the vehicle; extracting a voice instruction corresponding to the acquired one or more interface elements from the voice instruction set; and outputting the voice instruction to a speech engine, so that the speech engine processes a voice signal detected in the vehicle according to the voice instruction.

12 Claims, 4 Drawing Sheets

(56) References Cited

U.S. PATENT DOCUMENTS

| | | | |
|---|---|---|---|
| 11,648,955 B2* | 5/2023 | Sedaghat | G06F 3/167 |
| | | | 704/275 |
| 2012/0242473 A1 | 9/2012 | Choi | |
| 2016/0240189 A1* | 8/2016 | Lee | G10L 15/22 |
| 2020/0027452 A1* | 1/2020 | Rangarajan | G06F 3/167 |
| 2020/0135190 A1* | 4/2020 | Kaja | G06V 40/172 |
| 2020/0216086 A1* | 7/2020 | Lenke | B60W 30/18 |
| 2021/0158810 A1* | 5/2021 | Tzirkel-Hancock | G06F 3/167 |
| 2021/0183386 A1* | 6/2021 | Shi | G06F 3/167 |

FOREIGN PATENT DOCUMENTS

| | | | | |
|---|---|---|---|---|
| CN | 107204185 A | * | 9/2017 | G10L 15/22 |
| EP | 1307810 A2 | | 5/2003 | |
| EP | 1733383 A1 | | 12/2006 | |

* cited by examiner

VEHICLE, VOICE CONTROL DEVICE AND METHOD

CROSS-REFERENCE TO RELATED APPLICATION

The present application claims the benefit of priority of co-pending Chinese Patent Application No. CN 202110053539.3, filed on Jan. 15, 2021, and entitled "VOICE CONTROL DEVICE, SYSTEM AND METHOD FOR VEHICLE," the contents of which are incorporated in full by reference herein.

TECHNICAL FIELD

The present disclosure relates to the technical field of vehicle voice control, in particular to a voice control device for a vehicle and a vehicle including the voice control device, and to a corresponding method for vehicle voice control.

BACKGROUND

At present, more and more vehicles are equipped with intelligent voice control systems. Providing an intelligent voice system on a vehicle enables a driver of the vehicle to activate functions such as navigation, air conditioning, opening sunroof and playing music by voice control, so as to avoid a traffic accident caused by distraction of the driver when operating physical or virtual buttons to activate such functions.

A conventional vehicle voice control system uses wake-up words or trigger buttons. Such a voice control system may only begin to perform voice instructions after detecting a voice signal including a wake-up word or a press of a trigger button. Thus, the conventional vehicle voice control system requires at least the steps of detecting a wake-up word or a press of a trigger button and recognizing the wake-up word or calling a voice control instruction corresponding to trigger button. Further, the conventional vehicle voice control system requires a user to remember all voice-controllable instructions and to say the right voice instruction, which places a burden on the user.

Another conventional vehicle voice control system does not use any wake-up word or trigger button. Such a system may be controlled by an instruction set provided by an upper-level application. However, the instruction set includes very limited voice-controllable instructions, although none of the voice-controllable instructions requires a wake-up word or a press of a trigger button. If the instruction set includes excessive voice-controllable instructions, it is prone to mal-operations due to inadvertent mentioning of an instruction during a chat. Therefore, the assistance that such a voice control can provide to users is actually limited.

SUMMARY

In view of the above problems in the prior art, the present disclosure aims to provide an improved vehicle voice control solution, which can achieve vehicle voice control with both convenience and safety in various scenarios.

The disclosure provides in one aspect a voice control method for controlling functions of a vehicle including: creating a voice instruction set including voice instructions for converting interface elements associated with related vehicle functions into voice-controllable elements without any wake-up word; acquiring one or more interface elements currently presented on a human-machine interface (HMI) of the vehicle; extracting a voice instruction corresponding to the acquired one or more interface elements from the voice instruction set; and outputting the voice instruction to a speech engine, so that the speech engine processes a voice signal detected in the vehicle according to the voice instruction.

The disclosure provides in another aspect a vehicle including a human-machine interface (HMI), a voice input device, a voice control device and a speech engine. The voice control device is configured to: create a voice instruction set including voice instructions for converting interface elements associated with related vehicle functions into voice-controllable elements without any wake-up word; acquire one or more interface elements currently presented on the HMI; extract a voice instruction corresponding to the acquired one or more interface elements from the voice instruction set; and output the voice instruction to the speech engine, so that the speech engine processes a voice signal received from the voice input device according to the voice instruction.

The disclosure provides in yet another aspect a non-transitory computer readable medium with instructions stored therein which, when executed, causes a processor to carry out the steps including: creating a voice instruction set including voice instructions for converting interface elements associated with related vehicle functions into voice-controllable elements without any wake-up word; acquiring one or more interface elements currently presented on a human-machine interface (HMI) of the vehicle; extracting a voice instruction corresponding to the acquired one or more interface elements from the voice instruction set; and outputting the voice instruction to a speech engine, so that the speech engine processes a voice signal detected in the vehicle according to the voice instruction.

This Summary is provided to introduce a group of concepts that are further described below in the Detailed Description. It is not intended to identify key features or essential features of the claimed subject matter, nor is it intended to be used to limit the scope of the claimed subject matter.

BRIEF DESCRIPTION OF THE DRAWINGS

The disclosed aspects will hereinafter be described in connection with the appended drawings that are provided to illustrate and not to limit the scope of the disclosure.

DETAILED DESCRIPTION

In the prior art, a vehicle voice control solution, whether it uses wake-up words or not, involves semantic recognition based on limited voice-controllable instructions or natural semantic recognition for the whole sentence with the assistance of user operations of physical buttons or virtual buttons. In this way, the prior art solution has the problem of very limited voice-controllable scenarios, and also has the problem of complex manual operations. The disclosure proposes a vehicle voice control solution, which can achieve a voice control in "all scenes" without any wake-up word or manual operation.

According to an example of the disclosure, a voice instruction set is generated (created) in a vehicle. The voice instruction set includes voice instructions corresponding to interface elements on a human machine interface (HMI) of the vehicle, and the interface elements on the HMI can be converted into voice-controllable voice elements. As a result, as long as an interface element can be seen by a user of the vehicle, the interface element can be read out and controlled by voice. In other words, the voice control function of "to be seen, to be read" can be realized in the vehicle.

According to an example of the disclosure, if some or all of the interface elements on the HMI are changed or updated, available voice instructions will be dynamically adjusted according to the changed or updated interface elements, so that the voice control in the vehicle can be realized in "all scenes".

According to an example of the disclosure, it is not necessary for a user to read out any wake-up word at the beginning of the voice control, to remember a large number of complex voice instructions, to manually operate the HMI, and the "all scenes" voice control can be achieved in the vehicle, which brings an intelligent experience to the users of the vehicle. Examples of the disclosure will be described below with reference to the drawings.

Figure 1:
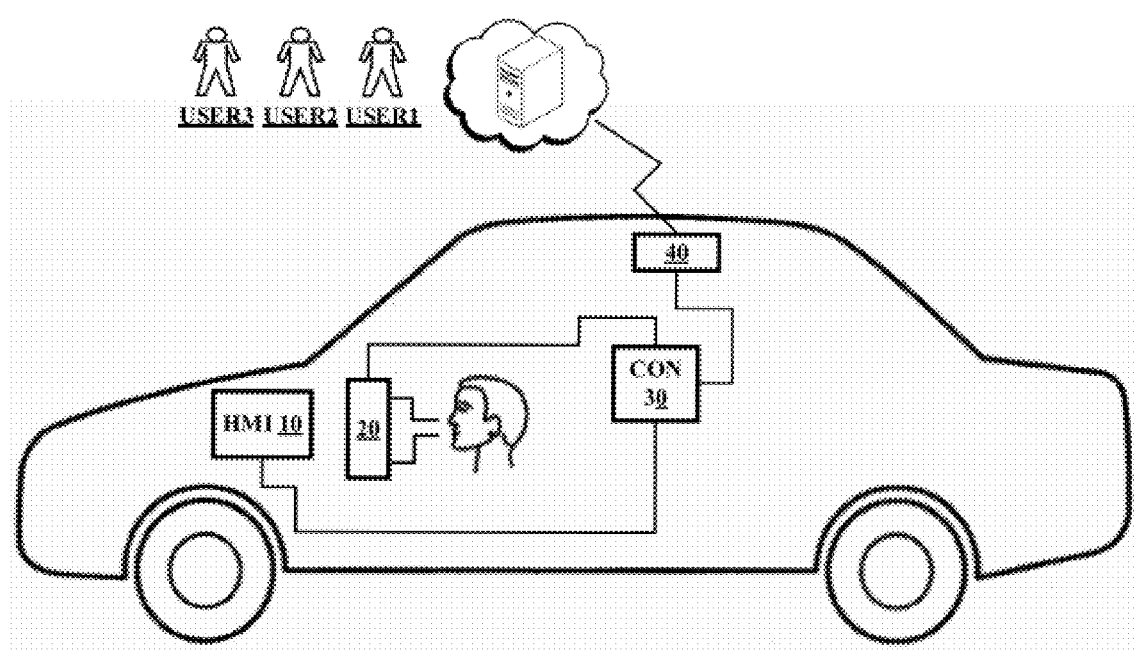
FIG. 1 schematically shows a vehicle equipped with an in-vehicle system for vehicle voice control according to an example of the disclosure.
Figure 2:
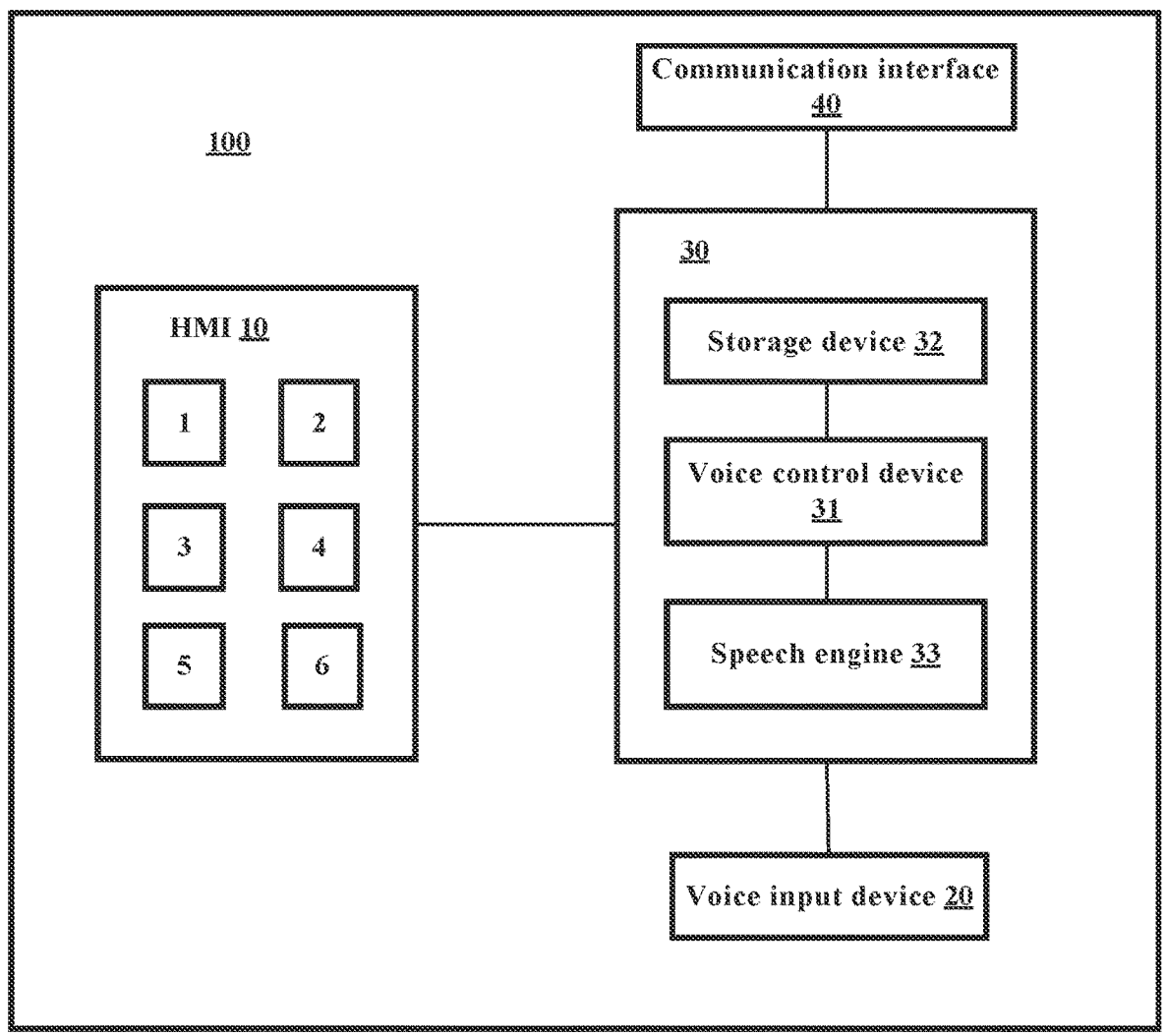
FIG. 2 is a schematic block diagram of the in-vehicle system shown in FIG. 1.

FIG. 1 schematically shows a vehicle equipped with an in-vehicle system 100 for vehicle voice control according to an example of the disclosure. FIG. 2 is a schematic block diagram of the in-vehicle system shown in FIG. 1.

Referring to FIGS. 1 and 2, the in-vehicle control system 100 includes an HMI 10, a voice input device 20 and a controller 30. The controller 30 includes a voice control device 31, a storage device 32 and a speech engine 33.

The HMI 10 is communicatively coupled to the controller 30. For example, the HMI 10 is communicatively coupled to the controller 30 via an in-vehicle bus. The HMI 10 includes a plurality of interface elements (for example, interface elements 1-6 shown in FIG. 2). The voice instructions corresponding to the interface elements are stored in the storage device 32. When an interface element is read out, the speech engine 33 converts the interface element into a corresponding voice-controllable element, which can be controlled by voice.

In an example, the HMI 10 may include a plurality of virtual buttons corresponding to a plurality of interface elements. Each virtual button may correspond to an interface element. Each interface element may have a sign such as a graphic or a symbol or text to indicate the function of the interface element. According to an example of the disclosure, the interface elements are converted into voice elements. If the user reads out a sign of an interface element, it is equivalent to physically clicking the virtual button corresponding to the interface element. Then, the function of the interface element will be performed.

The HMI 10 may be implemented by means of a device including a human-machine interface in the vehicle. For example, the HMI 10 may be implemented as a touch panel of the vehicle.

The voice input device 20 is used to receive (capture) voice signals of the users of the vehicle (e.g., a driver and a passenger of the vehicle). The voice input device 20 may be implemented as a microphone disposed in the vehicle or a plurality of microphones disposed at different locations in the vehicle.

The controller 30 may be implemented by means of an electronic control unit (ECU) of the vehicle or a domain controller of the vehicle, such as a central domain controller or an audio entertainment domain controller or an autonomous driving domain controller, or a vehicle control unit (VCU), such as a central computing platform.

The voice control device 31 has a voice control strategy, which includes generating a voice instruction set including voice instructions corresponding to interface elements and storing the voice instruction set in the storage device 32; acquiring the interface elements on the HMI 10 and extracting a voice instruction corresponding to the acquired interface elements; and transmitting the voice instruction to the speech engine 33, so that the speech engine 33 processes voice signals detected by the voice input device 20 in accordance with the voice instruction.

The voice control device 31 may be implemented by means of hardware or software or a combination of hardware and software, including a non-transitory computer readable medium stored in a memory and implemented as instructions executed by a processor. Regarding the part implemented by means of hardware, it may be implemented in application-specific integrated circuit (ASIC), digital signal processor (DSP), data signal processing device (DSPD), programmable logic device (PLD), field programmable gate array (FPGA), processor, controller, microcontroller, microprocessor, electronic unit, or a combination thereof. The part implemented by software may include microcode, program code or code segments. The software may be stored in a machine readable storage medium, such as a memory.

The voice control device 31 may include a plurality of functional modules (e.g., a plurality of software modules). The modules may be included in the same chip or circuit. The modules may also be provided in different chips or circuits.

In an example, the voice control device 31 is implemented as vehicle software. For example, the vehicle software is disposed (deployed) in a domain controller of the vehicle or an ECU or a VCU of the vehicle.

In an example, the voice control device 31 may include a memory and a processor. The memory includes instructions that, when executed by the processor, cause the processor to perform the vehicle voice control method/strategy of the disclosure.

The storage device 32 may be implemented as a vehicle memory. The storage device 32 may store the voice instruction set as well as a customized voice instruction set, which will be further described below. The storage device 32 may also store elements related to the voice control of the interface elements, such as values, icons, statements, etc. These relevant elements may be presented in a small window of the HMI 10 during a voice interaction happened in the vehicle. The storage device 32 may also store program codes for drivers of the in-vehicle system 100 and the peripherals thereof.

The speech engine 33 processes voice signals in accordance with the voice instructions received from the voice control device 31. In other words, how to process the voice signals and how to conduct the vehicle voice control are entirely in accordance with the voice instructions from the voice control device 31.

For example, if the speech engine 33 receives a voice signal of "turn on the air conditioner" detected by the voice input device 20, but does not receive any voice instruction regarding the temperature control from the voice control device 31; the speech engine 33 will ignore the voice signal of "turn on the air conditioner". That is to say, the operation of "turn on the air conditioner" will not happen in the vehicle. Therefore, to a certain extent, mal-operations caused by multiple users "scrambling for microphone" may be avoided, because voice signals irrelevant to instructions from the voice control device 31 will be ignored.

The in-vehicle system 100 may also include a communication interface 40. The vehicle may communicate with an external device (e.g., a cloud server) via the communication interface 40.

In an example, the in-vehicle system 100 is configured to be wirelessly communicated with a cloud server via the communication interface 40. Referring to FIG. 1, customized voice instruction sets, each of which includes personalized voice instructions, for multiple users (e.g., USER1-USER3) are stored in the cloud server. When one of the users (e.g., USER1) is in the vehicle, the user may send a request to the cloud server. Then, the in-vehicle system 100 receives the customized voice set corresponding to the user via the communication interface 40 from the cloud server.

The request can be sent to the cloud server in various ways. For example, the in-vehicle system 100 may determine the user identity by means of face recognition using sensors of the vehicle and send the request with the determined user identity to the cloud server. For example, the user may send the request to the cloud server via a personal smart wearable device. The received customized voice instruction set is stored in the storage device 32 so that the voice control device 31 can acquire the customized voice instruction set when needed. Thereby, a personalized voice control is realized in the vehicle.

Figure 3:
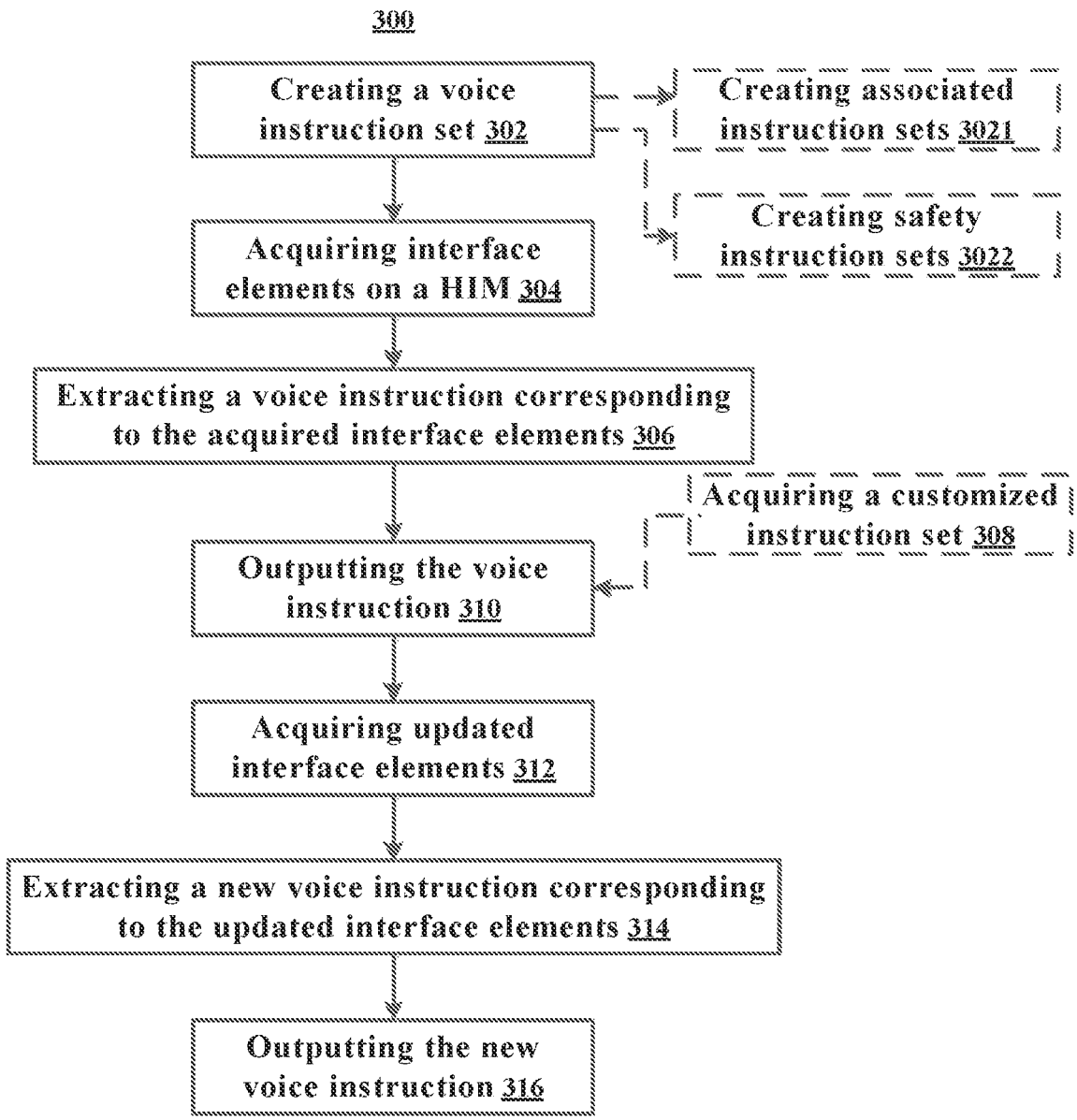
FIG. 3 schematically shows a vehicle voice control process according to an example of the disclosure.

FIG. 3 schematically shows a vehicle voice control process 300 according to an example of the disclosure. The process 300 may be executed in the voice control device 31.

Referring to FIG. 3, in block 302, the voice control device 31 creates a voice instruction set. The voice instruction set comprises a plurality of voice instructions for converting the interface elements into voice-controllable elements. An interface element may be associated with one or more voice instructions.

The HMI 10 may comprise a plurality of interfaces. For example, the interface presented on the HMI 10 changes as the scene changes or as the driving assistance function of the vehicle changes such that the HMI 10 can present an interface that corresponds to the current scene or the current driving assistance function. The voice instruction set includes voice instructions for all the interface elements. In other words, any interface element that can be presented on the HMI 10 can be controlled by voice.

In an example, different interface elements may have the same sign; however, when the same sign is shown at different interface elements, it represents different functions. In this example, the voice control device 31 generates the right voice instruction according to the specific functional meaning of the sign in the current scenario, and performs a corresponding voice control.

In an example, the voice control device 31 identifies a symbol on an interface element, translates the symbol into a corresponding text representation, and calls a voice instruction based on the text representation. For example, if a symbol "i" is shown on an interface element, the voice control device 31 identifies the symbol "i" and translates it into a corresponding text representation such as "temperature rising" or "page turning" or "screen scrolling forward" according to the current scene, and calls a voice instruction corresponding to the translated text representation.

Thus, according to an example of the disclosure, the function of each interface element in a specific scene can be accurately performed by the voice control.

In an example, the voice control device 31 creates a table for voice instructions of the voice instruction set. The voice instructions in the table are indexed according to functions or scenarios or numbers. The voice control device 31 may index and extract voice instructions corresponding to the interface elements on the HMI 10 from the table.

The voice instruction set may include voice instructions having one or more of the following aspects. The "all scenes" control in the vehicle can be realized by means of the one or more of the following aspects.

In a first aspect, if the voice input device 20 detects a voice signal indicating an interface element on the HMI 10 is read out; the voice control device 31 performs the function of the interface element.

For example, if an interface element has the symbol of "vehicle window", clicking of the interface element means opening or closing the vehicle window. Specifically, if the vehicle window is currently open, clicking of the interface element will realize the closing of the vehicle window; if the vehicle window is currently closed, clicking of the interface element will realize the opening of the vehicle window. In this case, if a user reads out "window" and the voice signal of "window" is detected by the voice input device 20, it is equivalent to clicking of the interface element having the symbol of "window", thereby achieving the opening or closing of the window.

In a second aspect, if the voice input device 20 detects a voice signal associated with the function of an interface element on the HMI 10; the voice control device 31 performs the semantic recognition (e.g., scene-text semantic recognition).

For example, an interface element on the HMI 10 has the function of adjusting temperature in the vehicle. If the voice input device 20 detects a voice signal including the words "too hot" or "too cold", the voice control device 31 will perform natural semantic recognition. Then, operations such as "turning up air conditioner", "opening window" and "turning on air conditioner" are performed according to voice interactions between the user and the HMI 10. The semantic recognition may be implemented by means of artificial intelligence (AI) techniques. For example, the semantic recognition is implemented by means of a trained machine learning model that is stored in the voice control device 31 in advance.

In a third aspect, if the voice input device 20 detects a voice signal indicating an interface element on the HMI is read out, the voice control device 31 performs the function of the interface element directly or after a double check.

For example, voice instructions such as "page up" and "page down", which are simply repeated and not involved with the execution of specific vehicle functions, may be performed directly without a double check. Voice instructions such as "turn on the autonomous driving function" and "turn on the lane assistance function", which relate to the execution of specific vehicle functions, in particular safety-related and vehicle control-related functions, are performed after the double check. In other words, functions of those voice instructions will be performed after a double check implemented by means of voice interactions between the user and the vehicle.

In an example, whether the function of an element requires the double check may be identified by a label of the element. For example, an element the function of which does not require the double check is labeled with a type of label; an element the function of which requires the double check is labelled with another type of label.

Thus, according to an example of the disclosure, a strategy having convenience, sensitivity and security is implemented in the design of the vehicle voice control.

In an example, referring to block 3021, creating the voice instruction set includes creating a plurality of associated instruction sets each of which includes voice instructions for interface elements that are related directly or indirectly in function. If the voice input device 20 detects a voice signal indicating an interface element on the HMI 10 is read out, the voice control device 31 sets all voice instructions included in the associated instruction set regarding the interface element so that the instructions are in an activated state for a period of time after said detection, even if some elements included in the associated instruction set are not currently present on the HMI 10.

It is noted that "voice control" or "voice control function" of the disclosure refers to the voice control without any wake-up word. The description of "activated state" or "the voice instruction being in an activated state" of the disclosure can be understood that the voice control function without any wake-up word can be performed. The description of "inactivated" or "the voice instruction being in an inactivated state" of the disclosure can be understood that the voice control function without any wake-up word cannot be performed.

In an example of the disclosure, the voice control device 31 adjusts the period of time based on the current driving assistance function or the current usage scenario. For example, the voice control device 31 adjusts the period of time to 20s from 15s because the current usage scenario requires a longer period of time. In other words, the period of time may be fixed, and may also be adjusted.

In an example, the voice control device 31 increases the period of time as the degree of relevance between the current driving assistance function and the safety of the vehicle increases. That is to say, the higher the degree of relevance is, the longer the period of time will be. For example, if a voice instruction is "keep a following distance of 100 m", the voice control device 31 sets all instructions included in the associated instruction set corresponding to the following distance to be available in the following 10 s (i.e., the voice control can be performed without any wake-up word in the following 10 s). If a voice instruction is "overtake on the left", the voice control device 31 sets all instructions included in the associated instruction set corresponding to the overtaking to be available in the following 30 s (i.e., the voice control can be performed without any wake-up word in the following 30 s). This is because the "overtaking" function has a stronger relevance with the safety of the vehicle than that of the "following distance" function.

In an example, the period of time corresponds to a respective one of a plurality of usage scenarios. The plurality of usage scenarios may include an emergency call scenario, an audio entertainment scenario and an autonomous driving scenario. The voice control device 31 sets a suitable effective period of time according to the current usage scenario. For example, the emergency call scenario is related to personal safety, and a longer period of time is set for instructions in the associated instruction set corresponding to the emergency call scenario; for instructions in the associated instruction set corresponding to the audio entertainment scene, a shorter period of time is set.

The voice control device 31 may create a topology diagram for voice instructions in an associated instruction set. In the topology diagram, elements for the same scene (e.g., elements for structural road or Geofence or country road) or for the same driving assistance function (e.g., elements for emergency braking or lane assistance or blind zone detection) or for closely related functions (e.g., elements for the functions of setting the seat temperature and setting the air outlet direction) are connected directly or indirectly. In the topology diagram, two closely related elements may be directly connected by a line. Two indirectly related elements may also be indirectly connected via several elements.

For example, if a topology diagram about the function of advanced driving assistance is created and the interface element of "navigation assistance" is read out, the voice control device 31 will set all the instructions included in the topology diagram regarding the advanced driving assistance to be available for a period of time (e.g., 30s), regardless of whether or not some elements for the advanced driving assistance are currently presented on the HMI 10.

In an example, the period of time is determined by the following formula:

$$t = T*[a*K + b*S*C]$$

where "t" is the period of time;

T" is a predetermined maximum value of the period of time t;

"K" is a weighting factor related to the function currently controlled by voice, and the value of "K" is between 0 and 1;

"S" is a weighting factor related to the current vehicle speed, and the value of "S" is between 0 and 1;

"C" is a weighting factor related to the complexity degree of the current traffic scene, and the value of "C" is a between 0 and 1;

"a" is a coefficient of "K", "b" is a coefficient of "S*C", the value of "a" is between 0.5 and 1, the value of "b" is between 0 and 0.5, and the sum of "a" and "b" is 1.

In this example, the maximum value T of the period of time t is predetermined as an initial value of an adjusting process for adjusting the period of time t. In the adjusting process, the voice control device 31 adjusts the initial value (i.e., the maximum value T) based on the three factors K, S and C such that the adjusted period of time is adapted to the current scene.

With respect to the factor K, the more urgent the current voice-controlled function is, for example, the function related to the safety of life and property, the larger the value of K is.

With regard to the factors S and C, these two factors are influenced by each other. These two factors are considered as a whole, for example, the product of the two factors is used. On one hand, the higher the current vehicle speed is, the larger the value S is and the longer the period of time t is; and on the other hand, the lower the complexity of the current traffic scene is, the smaller the value C is and the smaller the period of time t is.

With regard to the coefficients a and b, these coefficients are the coefficients of K and S*C, respectively. The sum of these coefficients is equal to 1. The coefficient "a" is greater than coefficient "b", indicating that the factor K is more important in determining the period of time t than that of the factors S and C.

It is noted that, in an example of the disclosure, the complexity C of the traffic scene may be determined as a quantified value, i.e., a quantified value between 0 and 1.

The higher the value C is, the higher the complexity of the traffic scene is; the lower the value C is, the less complex the traffic scene is.

In an example, referring to block 3022, creating a voice instruction set includes creating a plurality of safety instruction sets each of which includes voice instructions related to the safety of the vehicle in a scene or a driving assistance mode. The voice control device 31 sets all the voice instructions included in the safety instruction set corresponding to the current scene or the current driving assistance mode of the vehicle to be into an activated state.

For example, if the vehicle is currently in an autonomous driving mode, the voice control device 31 sets the voice instruction "turn off the autonomous driving" in an activated state during the autonomous driving mode. Thus, once the driver finds the autonomous driving may fail, the driver can take over the vehicle quickly without waiting for the switching of several pages of the HMI 10 to exit the autonomous driving mode, improving the safety of the voice control.

In block 304, the voice control device 31 acquires the interface elements currently presented on the HMI 10.

In block 306, the voice control device 31 extracts the voice instruction corresponding to the interface elements on the HMI 10 from the voice instruction set stored in the storage device 32, and converts the interface elements on the HMI into voice-controllable elements.

In block 308, in the case that a user of the vehicle requires his or her customized instruction set, customized instruction set may be acquired from the cloud server through the communication interface 40.

In block 310, the voice control device 31 outputs the extracted voice instruction to the speech engine 33 so that the speech engine 33 processes voice signals in accordance with the voice instruction.

In block 312, in the case that interface elements currently presented on the HMI 10 are completely updated or changed (e.g., the HMI 10 shows a page down) or partially updated or changed (e.g., a portion of elements on the HMI 10 are updated), the voice control device 31 acquires the updated or changed interface elements.

In block 314, the voice control device 31 acquires a new voice instruction corresponding to the updated or changed interface elements from the voice instruction set.

In block 316, the voice control device 31 outputs the new voice instruction to the speech engine 33 to enable the voice control of the updated or changed elements. Also, the voice control device 31 disables the voice control of the elements which have been removed from the HMI 10, i.e., the voice instruction for the elements which have been removed from the HMI 10 is in an inactivated state.

In addition, the voice control device 31 may enable or disable the voice control function of an interface element. For example, a user clicks a virtual button of an interface element to cancel the voice control function of that element. As a result, the function of that element cannot be voice controlled. Moreover, the user clicks the virtual button of that element one more time to restore the voice control function of that element. As a result, the function of that element can be voice controlled.

Therefore, in an example, undesired voice-controlled functions can be cancelled to avoid mal-operation and improve the safety of the vehicle voice control.

Figure 4:
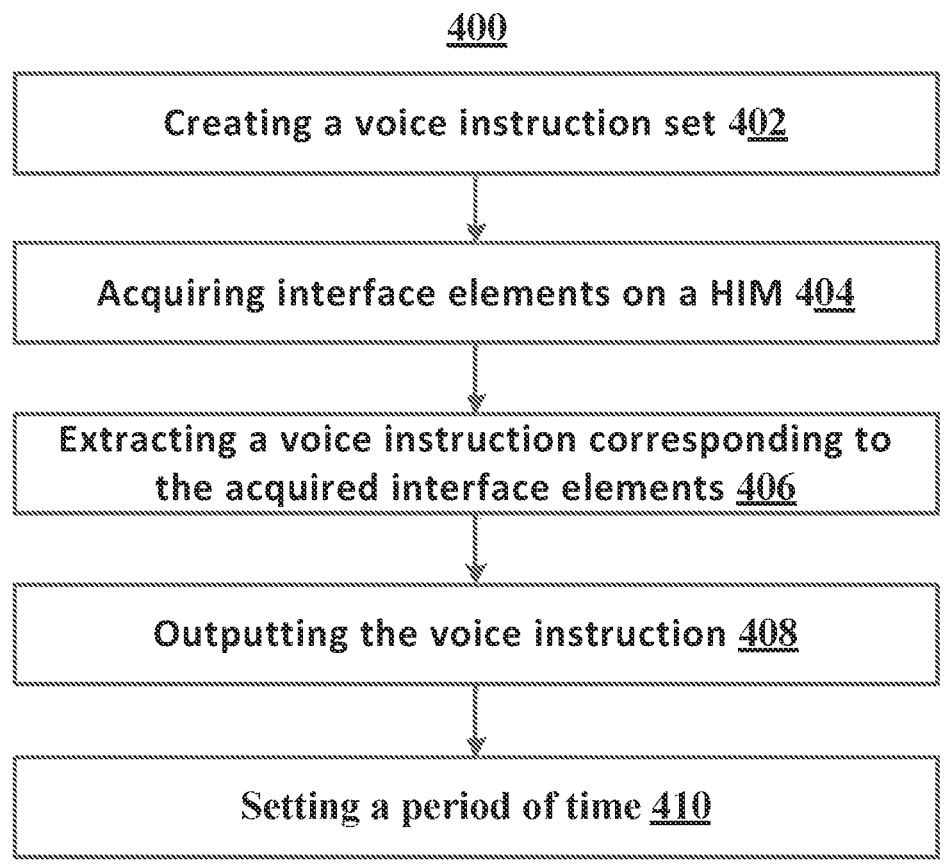
FIG. 4 is a flowchart of a vehicle voice control method according to an example of the disclosure.

FIG. 4 illustrates a vehicle voice control method 400 according to an example of the disclosure. The method can be performed by means of a device 31 as described above and/or a system 100 as described above. For this reason, various features, which are described above with reference to the device and the system, are also applicable in the method.

Referring to FIG. 4, in step 402, a voice instruction set is created. The voice instruction set includes voice instructions for converting interface elements into voice-controllable elements without any wake-up word. The step of creating the voice instruction set includes creating a plurality of associated instruction sets each of which includes voice instructions for interface elements that are associated with each other in function.

In step 404, interface elements currently presented on the HMI are acquired.

In step 406, a voice instruction corresponding to the acquired interface elements is extracted from the voice instruction set.

In step 408, the voice instruction is output to a speech engine, so that the speech engine processes voice signals detected in the vehicle according to the voice instruction.

In step 410, if a voice signal, which indicates an interface element on the HMI is read out, is detected, all the voice instructions included in an associated instruction set corresponding to the interface element are set into an activated state for a period of time after the detection.

The disclosure provides a non-transitory computer readable medium with instructions stored therein which, when executed, causes a processor to carry out the steps of the vehicle voice control method 400 described above.

It is noted that all the operations in the method described above are merely exemplary, and the disclosure is not limited to any operations in the method or sequence orders of these operations, and should cover all other equivalents under the same or similar concepts.

The processors can be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a micro-controller, a digital signal processor (DSP), a field programmable gate array (FPGA), a programmable logic device (PLD), state machine, gate logic, discrete hardware circuitry, and other suitable processing components configured to perform the various functions described in this disclosure. The functions of a processor, any portion of a processor, or any combination of processors presented in this disclosure may be implemented as software executed by a microprocessor, a micro-controller, a DSP, or other suitable platforms.

Software should be considered broadly to represent instructions, instruction sets, code, code segments, program code, programs, subroutines, software modules, applications, software applications, software packages, routines, subroutines, objects, running threads, processes, functions, and the like. Software can reside on a non-transitory computer readable medium. Such non-transitory computer readable medium may include, for example, a memory, which may be, for example, a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalent transformations to the elements of the various aspects of the disclosure, which are known or to be apparent to those skilled in the art, are intended to be covered by the claims.

The invention claimed is:

1. A voice control method for controlling functions of a vehicle, comprising:
    creating a voice instruction set including voice instructions by converting interface elements of a human machine interface (HMI) of the vehicle into voice-controllable elements;
    acquiring one or more interface elements currently presented on the HMI of the vehicle;
    extracting a voice instruction corresponding to the acquired one or more interface elements from the voice instruction set; and
    outputting the voice instruction to a speech engine of the vehicle, so that the speech engine processes a voice signal detected in the vehicle according to the voice instruction;
    wherein creating the voice instruction set comprises creating a plurality of associated instruction sets, each associated instruction set including voice instructions for interface elements functions of which are associated with each other, and the method further comprises:
    in the case that it is detected an interface element on the HMI is read out, setting all voice instructions included in an associated instruction set from the plurality of associated instruction sets that includes the voice instruction for the read out interface element into an activated state for a period of time;
    wherein the activated state of a voice instruction refers to the voice control function of the voice instruction being able to be performed, and
    wherein the period of time is determined by:

$t=T*[a*K+b*S*C]$, wherein:

t is the period of time,
    T is a predetermined maximum value of the period of time t,
    K is a weighting factor related to the function currently controlled by voice, and the value of K is between 0 and 1,
    S is a weighting factor related to the current vehicle speed, and the value of S is between 0 and 1,
    C is a weighting factor related to the complexity degree of the current traffic scene, and the value of C is between 0 and 1, and
    a is a coefficient of K and b is a coefficient of S*C, and the value of a is between 0.5 and 1, the value of b is between 0 and 0.5, and the sum of a and b is 1.

2. The voice control method according to claim 1, the method further comprising adjusting the period of time based on characteristics of the related vehicle function associated with the interface elements read out in the voice signal or the vehicle's current usage scenario.

3. The voice control method according to claim 2, wherein adjusting the period of time comprises increasing the period of time as relevance between the related vehicle function and safety of the vehicle increases.

4. The voice control method according to claim 1, the method further comprising:
    when some or all of the interface elements on the HMI are changed, acquiring the changed interface elements;
    extracting a new voice instruction corresponding to the changed interface elements from the voice instruction set; and
    outputting the new voice instruction to the speech engine to achieve the voice control for the changed interface elements.

5. The voice control method according to claim 1, the method further comprising: if the voice signal indicates at least one of the acquired one or more interface elements is read out, performing the related vehicle function associated with the read-out interface element.

6. The voice control method according to claim 1, the method further comprising: performing semantic recognition of the voice signal if the voice signal indicates at least one of the acquired one or more interface elements is read out.

7. The voice control method according to claim 1, the method further comprising if the voice signal indicates at least one of the acquired one or more interface elements is read out, determining whether to perform the related vehicle function associated with the read-out interface element directly or after a double check based on characteristics of the related vehicle function and performing the related vehicle function accordingly.

8. The voice control method according to claim 1, wherein creating the voice instruction set comprises creating a plurality of safety instruction sets each of which includes voice instructions related to safety of the vehicle in a scene or a driving assistance mode, and
    wherein the method further comprises setting all the voice instructions included in the safety instruction set corresponding to the current scene or the current driving assistance mode of the vehicle in an activated state.

9. The voice control method according to claim 1, the method further comprising: acquiring a customized instruction set based on identity of the vehicle user or in response to a request from the vehicle user, and outputting the customized instruction set to the speech engine.

10. A vehicle comprising a human-machine interface (HMI), a voice input device, a voice control device and a speech engine, the voice control device being configured to:
    create a voice instruction set including voice instructions by converting interface elements of the HMI into voice-controllable elements;
    acquire one or more interface elements currently presented on the HMI;
    extract a voice instruction corresponding to the acquired one or more interface elements from the voice instruction set; and
    output the voice instruction to the speech engine, so that the speech engine processes a voice signal received from the voice input device according to the voice instruction;
    wherein creating the voice instruction set comprises creating a plurality of associated instruction sets, each associated instruction set including voice instructions for interface elements functions of which are associated with each other, and the voice control device is further configured to:
    in the case that it is detected an interface element on the HMI is read out, setting all voice instructions included in an associated instruction set from the plurality of associated instruction sets that includes the voice instruction for the read out interface element into an activated state for a period of time;

wherein the activated state of a voice instruction refers to the voice control function of the voice instruction being able to be performed, and wherein the period of time is determined by:

$$t=T*[a*K+b*S*C], \text{wherein:}$$

t is the period of time,

T is a predetermined maximum value of the period of time t,

K is a weighting factor related to the function currently controlled by voice, and the value of K is between 0 and 1, S is a weighting factor related to the current vehicle speed, and the value of S is between 0 and 1, C is a weighting factor related to the complexity degree of the current traffic scene, and the value of C is between 0 and 1, and a is a coefficient of K and b is a coefficient of S*C, and the value of a is between 0.5 and 1, the value of b is between 0 and 0.5, and the sum of a and b is 1.

11. The vehicle according to claim 10, wherein the voice control device is further configured to: enable or disable voice control of at least one of the one or more interface elements on the HMI based on inputs of the vehicle user.

12. A non-transitory computer readable medium with instructions stored therein which, when executed, causes a processor to carry out the steps comprising:

creating a voice instruction set including voice instructions by converting interface elements of a human machine interface (HMI) of a vehicle into voice-controllable elements;

acquiring one or more interface elements currently presented on the HMI of the vehicle;

extracting a voice instruction corresponding to the acquired one or more interface elements from the voice instruction set; and outputting the voice instruction to a speech engine of the vehicle, so that the speech engine processes a voice signal detected in the vehicle according to the voice instruction;

wherein creating the voice instruction set comprises creating a plurality of associated instruction sets, each associated instruction set including voice instructions for interface elements functions of which are associated with each other, and the method further comprises:

in the case that it is detected an interface element on the HMI is read out, setting all voice instructions included in an associated instruction set from the plurality of associated instruction sets that includes the voice instruction for the read out interface element into an activated state for a period of time;

wherein the activated state of a voice instruction refers to the voice control function of the voice instruction being able to be performed, and wherein the period of time is determined by:

$$t=T*[a*K+b*S*C], \text{wherein:}$$

t is the period of time,

T is a predetermined maximum value of the period of time t,

K is a weighting factor related to the function currently controlled by voice, and the value of K is between 0 and 1, S is a weighting factor related to the current vehicle speed, and the value of S is between 0 and 1, C is a weighting factor related to the complexity degree of the current traffic scene, and the value of C is between 0 and 1, and a is a coefficient of K and b is a coefficient of S*C, and the value of a is between 0.5 and 1, the value of b is between 0 and 0.5, and the sum of a and b is 1.

* * * * *